March 3, 1970  J. E. CHAPMAN  3,498,274
FUEL INJECTOR FOR INTERNAL COMBUSTION ENGINES
Filed April 29, 1968
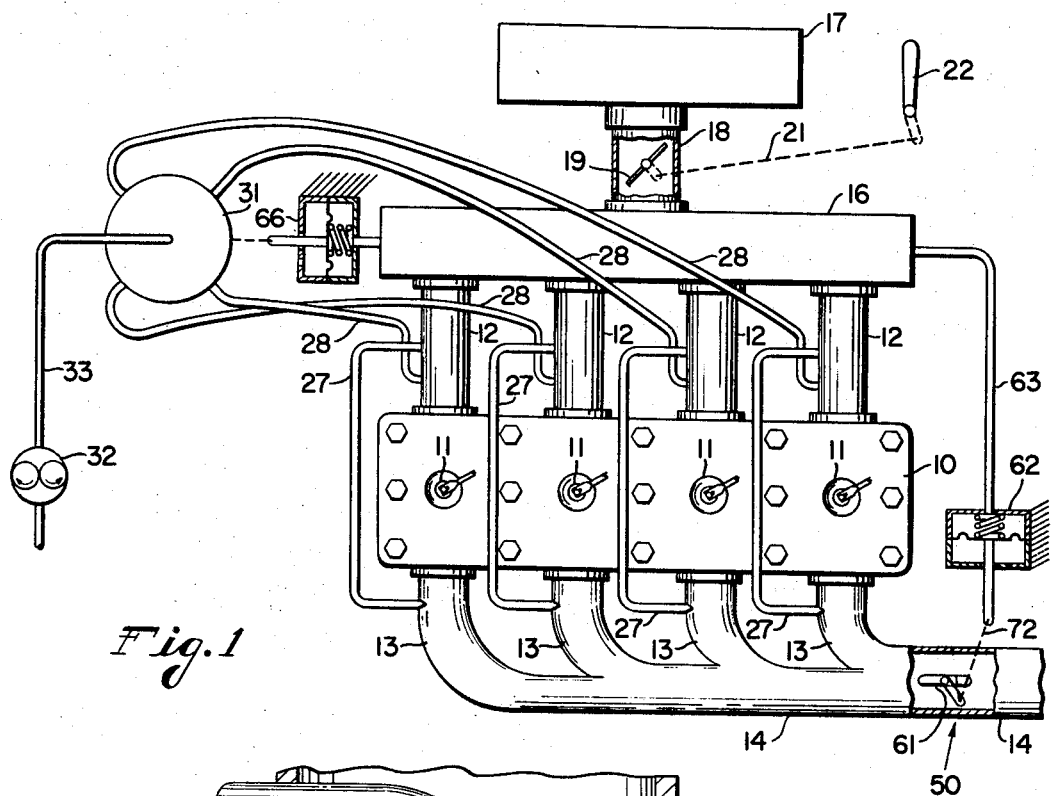
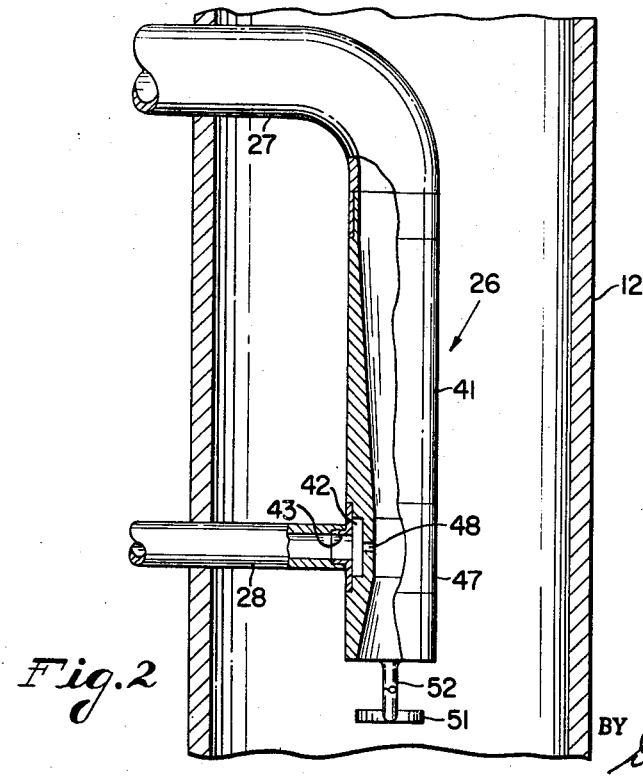
INVENTOR.
JAMES E. CHAPMAN
ATTORNEY

United States Patent Office 3,498,274
Patented Mar. 3, 1970

3,498,274
FUEL INJECTOR FOR INTERNAL COMBUSTION
ENGINES
James E. Chapman, Marina Del Rey, Calif., assignor to
The Garrett Corporation, Los Angeles, Calif., a corporation of California
Filed Apr. 29, 1968, Ser. No. 724,963
Int. Cl. F02b 33/00, 33/32, 39/00
U.S. Cl. 123—119                                    5 Claims

ABSTRACT OF THE DISCLOSURE

An internal combustion engine having a fuel injector nozzle disposed at each intake port and a fuel distribution system that feeds predetermined quantities of fuel to each nozzle synchronous with the engine speed. Each nozzle is connected to the exhaust of the respective cylinder to cause some of the hot exhaust gases to pass axially through the nozzle to vaporize the fuel.

---

This invention relates to a means for producing an intimate, controlled air-fuel mixture for an internal combustion engine.

Internal combustion engines of the prior art exhaust relatively large amounts of smog producing compounds into the atmosphere. These compounds are generally partially burnt fuel and oxides of nitrogen. Therefore, if improved combustion could be obtained, the production of these smog producing compounds could be reduced. Improved or more complete combustion could be obtained by improving the mixing of fuel and air, i.e., liquid fuel should be completely vaporized, and by improving the mixture of fuel and air, i.e., the ratio of air to fuel should be balanced for each cylinder, and a small percentage of combustion products should be combined with the fuel-air mixture.

An object of this invention is to produce a more thorough intermixing of fuel and air in an internal combustion engine.

Another object of this invention is to control the ratio of air to fuel entering each cylinder of an internal combustion engine.

Another object of this invention is to reduce the ratio of nitrous oxides in the emission products of a gasoline engine.

The foregoing and other objects, advantages and characterizing features of this invention will become apparent from the ensuing detailed description of the illustrative embodiment thereof, reference being made to the accompanying drawing wherein:

FIG. 1 is a schematic of an internal combustion engine incorporating the novel features of the invention; and FIG. 2 is an enlarged section of one of the intake pipes for one cylinder of the engine.

Referring to the drawing and to FIG. 1 in particular, an internal combustion engine 10 having, for example, four cylinders is schematically illustrated. The engine 10 should preferably be of the Otto cycle type wherein the fuel-air mixture is compressed before being ignited by spark plugs 11. Spark plugs 11 are standard wherein a spark jumps an air gap to ignite the mixture. The engine includes intake pipes 12 and exhaust pipes 13, one of each for each cylinder, and includes intake and exhaust valve means (not shown) as is common in the art. The exhaust pipes 13 join with a tail pipe 14 while the intake pipes 12 communicate with an air plenum or manifold 16. Air is supplied to the plenum 16 through an air filter 17 coupled to a pipe 18 containing a throttle valve 19. Suitable linkage 21 is provided to connect the valve 19 to a manually operated actuator 22. Valve 19 is, for example, of the disk butterfly type that pivots on a shaft disposed on a diameter.

In this invention, fuel is supplied to the air while it is in the intake pipes 12 just before the air passes through the intake port (not shown) into the cylinder. As shown in FIG. 2, fuel is added with the aid of a nozzle 26 located in each intake pipe 12 and the nozzle is of the type disclosed in the copending application Ser. No. 706,087, filed Feb. 16, 1968; titled Air Powered Liquid Vaporizer, inventors James E. Chapman and John M. Haasis, and assigned to the same assignee as this application. A tubing 27 supplies, to each nozzle 26, hot exhaust gases from the exhaust pipe 13 of the corresponding cylinder while another tubing 28 supplies fuel from a suitable fuel distributor 31 that is well known in the art. The fuel distributor 31 is synchronized by suitable gearing (not shown) with the engine 10. Fuel is supplied to the distributor 31 by a fuel pump 32 that pumps fuel through a tubing 33.

Referring to FIG. 2, the nozzle 26 has a tubular body 41. The body 41 is preferably disposed within and coaxially with the intake pipe 12 and held in place, for example, by tubing 27 and 28 passing through the wall of the intake pipe 12. Tubing 27 is suitably connected to one end of the body 41 to cause the exhaust gases to flow axially therethrough. As disclosed in the above-mentioned copending application, the interior wall of body 41 has converging and diverging sections. Around the outside of body 41 and opposite the smallest interior diameter, a circumferential groove 42 is formed. A suitable sleeve 47 is brazed to the body to cover the groove 42. Suitable ports 48 (for example, two) are provided in body 41 so that the groove 42 communicates with the interior of the body 41. The fuel tubing 28 is connected to a port 43 in sleeve 47, so that fuel is fed to the interior of the nozzle 26 and mixes with the exhaust gases therein. The air is mixed with the exhaust gas and fuel mixture after the mixture leaves the nozzles. A plate 51, spaced from the end of the body 41, enhances the mixing process by causing the fluid to form vortices in which the fuel vaporizes rapidly due to the low pressure associated therewith. The mixture (fuel, exhaust gas and air) is drawn into the cylinder during the intake stroke.

The prior art teaches that between 10 to 20 percent of the combustion products leaving the cylinders should be recirculated back through the cylinder in order to decrease the percentage of smog producing compounds in the exhaust gas, liberated into the atmosphere. This invention incorporates a means 50 to accomplish this function. Means 50 includes a standard type butterfly valve 61 which is installed within the tail pipe 14 (FIG. 1). The valve is actuated, for example, by a suitable pneumatic device 62. The valve 61 is shown in its wide open position. The valve is in the wide open position when the engine is stopped and also, as will be explained hereinafter, when the engine is producing full power. However, since device 62 communicates with the plenum 16 through a tube 63 and is also linked to the valve 61 by suitable linkage 72, the vacuum pressure in the plenum 16 during operations now controls the angular position of valve 61. The amount that valve 61 closes or restricts the flow within pipe 14 is related to the degree of vacuum in the plenum 16. When the engine is idling the vacuum is highest within the plenum and device 62 causes valve 61 to be almost closed. The valve 61 should close sufficiently to ensure that a pressure within the tail pipe is formed to cause 10 to 20 percent of the exhaust products to recirculate through the cylinders. However, as the engine speeds up as the load demand increases, the vacuum in plenum 16 decreases (approaches atmospheric) while the pressure of the gases leaving the cylinders rises since the back pressure function is accomplished by the muffler. Then, due to spring action in the device 62, the valve 61 is made to open as the engine speed increases. Thus by choosing the correct spring constant in device 62, and orificing of line 27, the valve 61 could be positioned so that the 10 to 20 percent recirculation of the exhaust gases is maintained through the cylinders under substantially all load demands. On the other hand, to maintain the proper air-to-fuel ratio, the amount of fuel fed to the nozzles by the fuel distributor 31 is also related to the pressure within the plenum 16. This is accomplished in a manner well known in the art, for example, by another suitable pneumatic device 66 (schematically shown) coupled between the distributor 31 and the air plenum 16. The device 66 controls the amount of fuel delivered to the nozzles 26 for each intake stroke.

In this system the pressure of the air into each intake pipe 12 is the same; each of the nozzles 26 is the same as the other; and the exhaust gases come from the same source. Then each intake pipe is fed with the same amount of fuel. Thus, each cylinder has substantially the same fuel-to-air ratio. The fuel-to-air ratio could be controlled at various engine speeds for maximum efficiency. The percentage of exhaust gases recirculating through the cylinders is preferably maintained between 10 to 20 percent by means 50 as it closes the valve 61 when the throttle valve 19 closes and opens valve 61 when the throttle valve 19 opens.

In light of the above teachings, various modifications and variations of the present invention are contemplated that would be apparent to those skilled in the art without departing from the spirit and scope of the invention. Therefore, the invention is not limited to the exemplary apparatus or procedures described, but includes all embodiments within the scope of the claims.

What is claimed is:

1. An internal combusion engine comprising, a plurality of cylinders, each having an intake pipe and an exhaust pipe;
   a fuel nozzle disposed within each intake pipe;
   first means for supplying exhaust gases from said cylinders to said nozzles; and
   second means for distributing fuel to each nozzle, and nozzles each including a tubular body wherein the fuel passes through an orifice disposed in a wall thereof, and
   a plate disposed on the axis of the tubular body spaced from the exit thereof to cause the mixture of fuel and exhaust gases to be deflected by the plate and form vortices around the edges to increase vaporization of the fuel.

2. The engine of claim 1 wherein:
   said first means includes tubing connecting each nozzle with the respective exhaust pipe for the particular cylinder.

3. The engine of claim 2 wherein:
   said exhaust pipes communicate with a tail pipe,
   third means is disposed in said tail pipe for controlling the pressure within said exhaust pipes,
   an air plenum is provided before the intake pipes so that air flows from the plenum into the intake pipes; and
   fourth means is provided that is responsive to the air pressure in said plenum for controlling said third means in response thereto so that the pressure within the exhaust pipes causes between 10 to 20 percent of the exhaust gases, exiting the cylinders, to pass back through the cylinders.

4. An internal combustion engine comprising,
   a plurality of cylinders, each having an intake pipe and an exhaust pipe;
   a fuel nozzle disposed within each intake pipe;
   first means for supplying exhaust gases from said cylinders to said nozzles; and
   second means for distributing fuel to each nozzle,
   said first means including tubing connecting each nozzle with the respective exhaust pipe for the particular cylinder;
   third means disposed for controlling the pressure within said exhaust pipes;
   an air plenum disposed before the intake pipes so that air flows from the plenum into the intake pipes;
   a throttle valve disposed at the intake of said air plenum to control the air pressure therein; and
   fourth means responsive to the air pressure within sad plenum for actuating said third means to assure that the pressure within the exhaust pipe is sufficient to cause some of the exhaust gas to flow through said nozzles.

5. An internal combustion engine comprising,
   a plurality of cylinders, each having an intake pipe and an exhaust pipe;
   a fuel nozzle disposed within each intake pipe;
   first means for supplying exhaust gases from said cylinders to said nozzles;
   a second means for distributing fuel to each nozzle;
   said exhaust pipes communicating with a tail pipe;
   third means disposed in said tail pipe for controlling the pressure within said exhaust pipes to maintain said pressure at a valve to hold the percentage of exhaust gases, mixed with the fuel and air, within a predetermined limit for all engine speeds;
   an air plenum disposed before the intake pipes so that air flows from the plenum into the intake pipes;
   said nozzles each including a tubular body wherein the fuel passes through an orifice disposed in a wall thereof; and
   a plate disposed on the axis of the tubular body spaced from the exit thereof to cause the mixture of fuel and exhaust gases to strike the plate and form vortices around the edges to provide increased vaporization of the fuel.

References Cited

UNITED STATES PATENTS 3,416,503  12/1968  High.

WENDELL E. BURNS, Primary Examiner

U.S. Cl. X.R.

123—139